United States Patent [19]

Stanley

[11] Patent Number: 5,074,822
[45] Date of Patent: Dec. 24, 1991

[54] METHOD OF CLOSING A TUBULAR FOOD CASING

[75] Inventor: Thomas R. Stanley, Kansas City, Mo.

[73] Assignee: Teepak, Inc., Westchester, Ill.

[21] Appl. No.: 519,046

[22] Filed: May 4, 1990

[51] Int. Cl.⁵ .............................................. A22C 11/02
[52] U.S. Cl. ..................................... 452/30; 452/186;
383/88; 138/118.1
[58] Field of Search ..................... 452/32, 186, 30, 39;
53/134; 383/82, 88; 138/89, 118.1; 426/105,
135, 138

[56] References Cited

U.S. PATENT DOCUMENTS 2,307,181 1/1943 Young ..................................... 383/82
3,650,774 3/1972 Beth et al. ............................. 452/39
4,314,558 2/1982 Korpman ................................ 383/88
4,876,125 10/1989 Akao et al. ............................ 383/88

Primary Examiner—Willis Little
Attorney, Agent, or Firm—Robert P. Simpson; Michael L. Dunn

[57] ABSTRACT

A method is provided for closing an end of a tubular food casing in such a way that the end so closed is made suitable for use as a hanger for the casing. In one embodiment, an end of a food casing is formed into a rigid loop suitable for hanging the casing. In a second embodiment, a die cut hole is made in a uniquely formed end of a casing, enabling the casing to be suspended by a hook inserted through the hole.

24 Claims, 3 Drawing Sheets

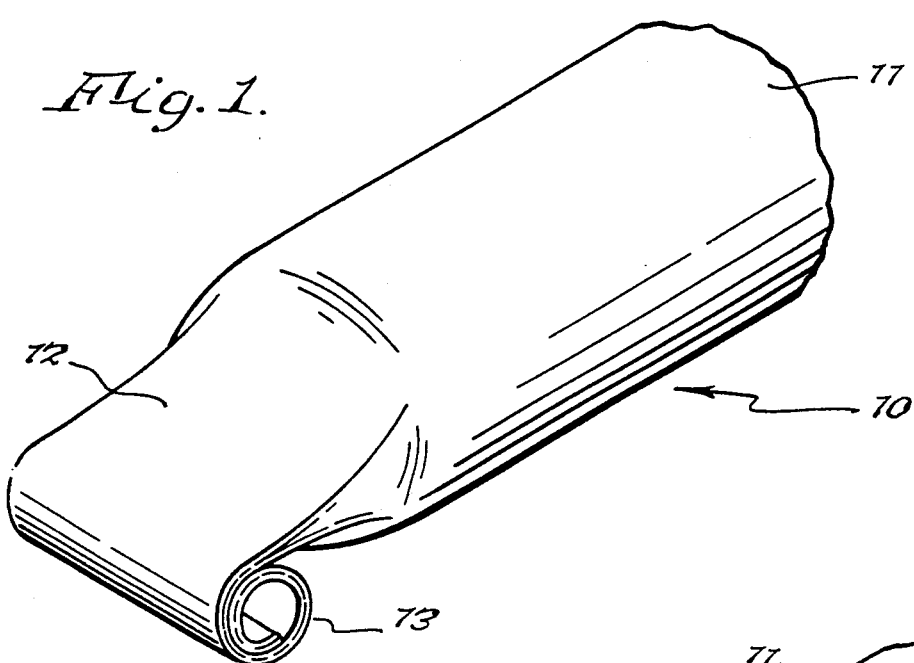
Fig. 1.
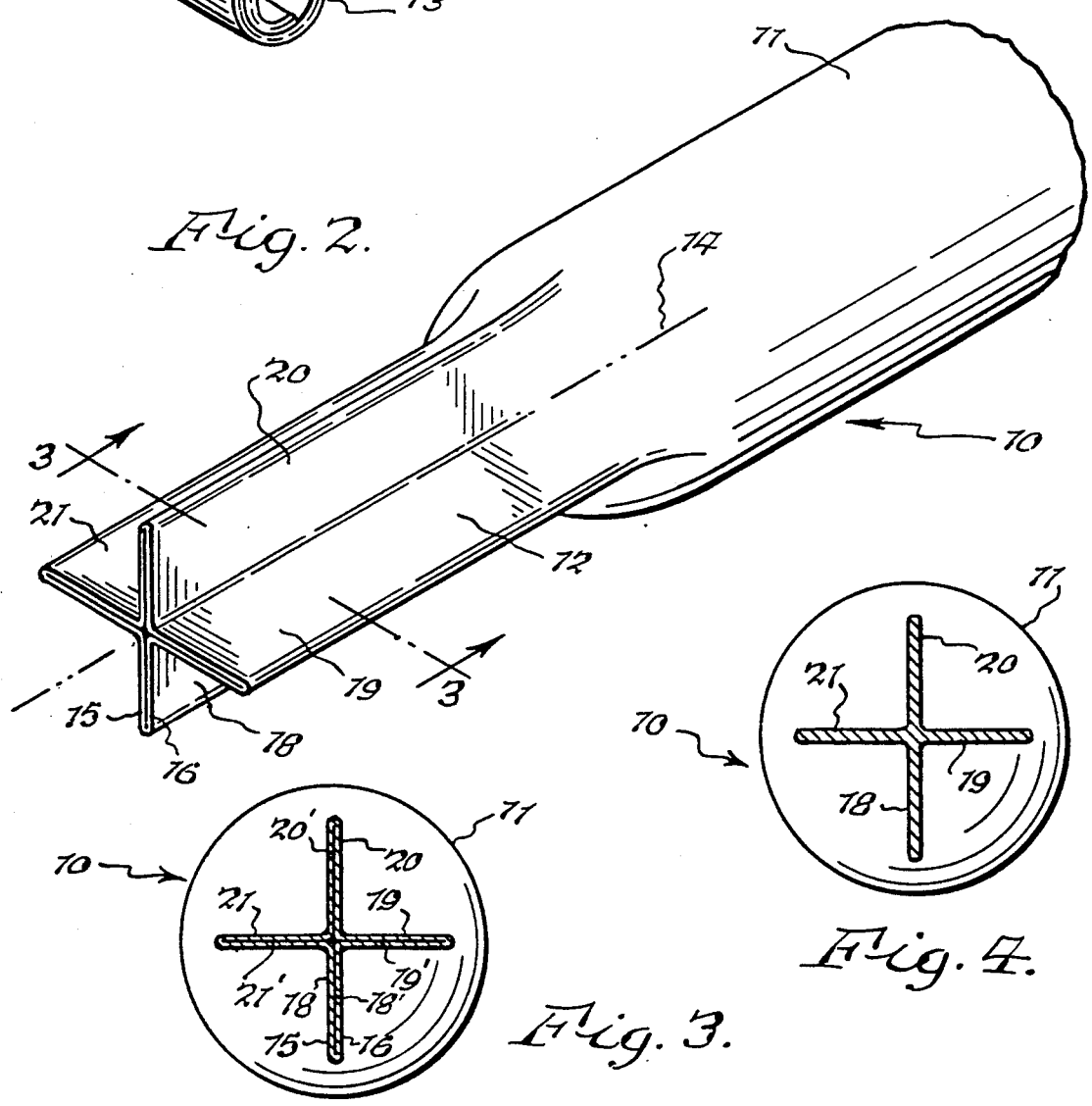
Fig. 2.
Fig. 3.
Fig. 4.

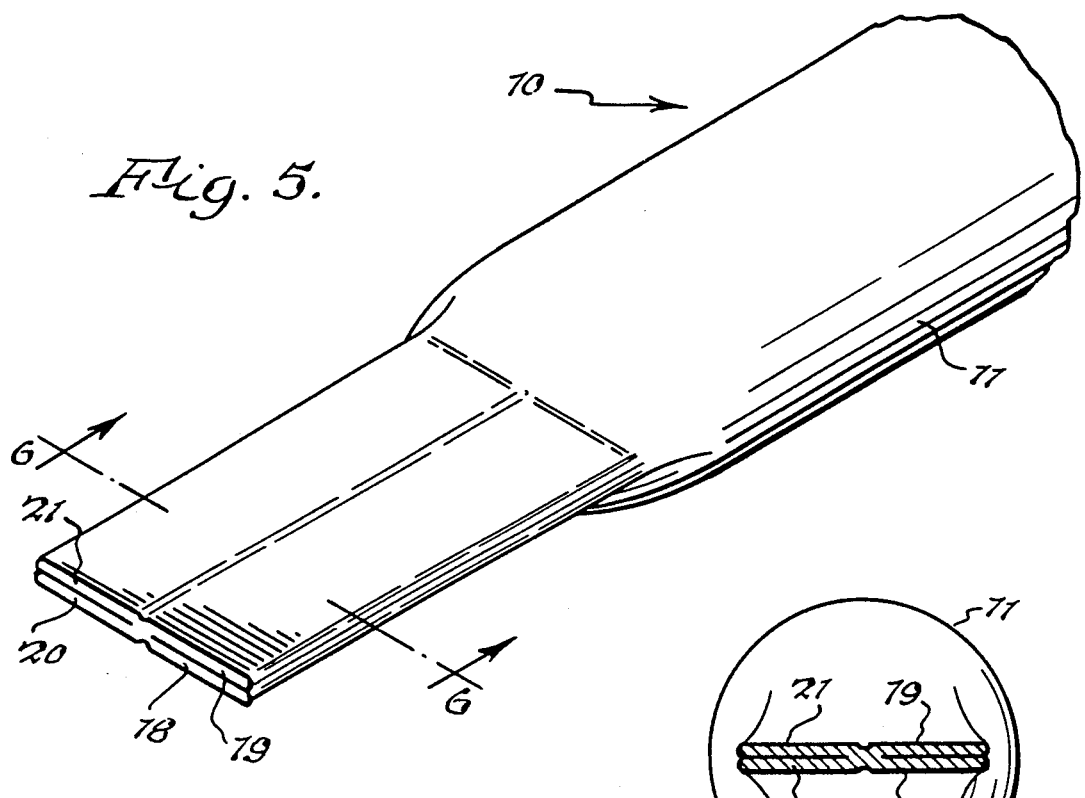
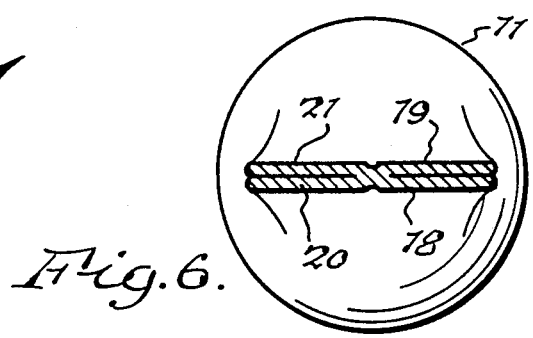
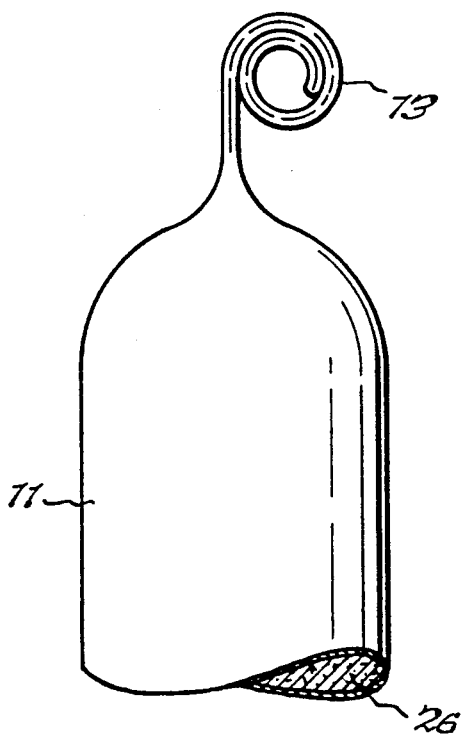
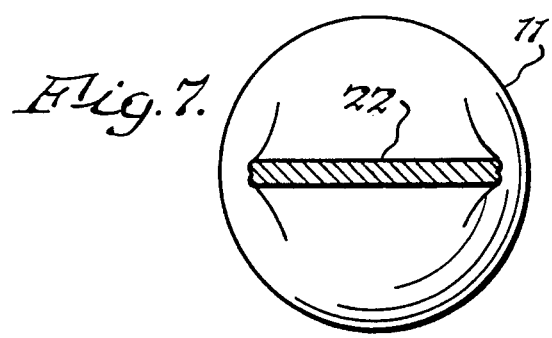
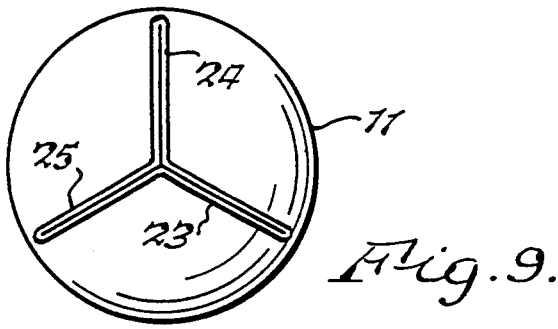

METHOD OF CLOSING A TUBULAR FOOD CASING

BACKGROUND OF THE INVENTION

This invention relates generally to a process of closing an end of a tubular food casing.

Food products such as sausage and other processed meats are often packaged in tubular casings which are closed at both ends. In many cases, the casings are tied or clipped at both ends, and a separate hanger is secured to the casing to enable draping or looping of the foodstuffed casing over a hook or rack device during smoking and other preparatory stages of processing. The hangers also provide a convenient way for retailers to store and display sausage and other tubular encased food products.

Obviously, then, a significant expense is incurred in providing hanger members for tubular food casings. A longfelt need has existed for a method of closing tubular food casings which would obviate separate hangers Yet another problem with conventional closure methods such as tying or clipping the end of the casing is the resultant generally rounded shape of the end of the sausage or food product (see, e.g., Ernst, U.S. Pat. No. 4,227,668, Oct. 14, 1980). Ideally, a sausage should take on a perfectly cylindrical shape, flat on both ends. This shape is practically unattainable with conventional tubular casings using known methods of closure, and the resultant rounded ends result in undesirable shapes and wasted quantities of food product which the butcher or retailer frequently discards. Hence, a need has also existed for a method of closing a tubular casing which results in a more perfectly cylindrical shape of the encased food product.

SUMMARY OF THE INVENTION

The present invention provides a method of closing a tubular food casing by forming excess casing at one end of the casing into a hanger member for hanging the casing.

More specifically, a method of the invention includes the steps of making a plurality of longitudinal folds in one end of the casing, where each of the folds includes at least two layers of the casing and each of the folds extends radially outward from a longitudinal centerline of the tubular casing, and, sealing each of the layers together to prevent food product from escaping through the folds.

In one embodiment of the invention, a method of closing a tubular food casing is provided, including the steps of forming excess casing at one end of the casing into a flattened portion, coating the flattened portion with adhesive, and forming the flattened portion into a rigid loop for use as a hanger for the casing.

In another embodiment of the invention, a method of closing a tubular food casing is provided, including the steps of making a plurality of longitudinal folds in one end of the casing, where each of the folds includes at least two layers of the casing and each of the folds extends radially outward from a longitudinal centerline of the tubular casing, sealing the two layers together to prevent food product from escaping through the folds, and making a hole in at least one of the folds to accommodate a hanger for the casing.

A primary object of the invention is to provide a method of closing tubular food casings which obviates separate hangers.

A secondary object of the invention is to provide a method of closing a tubular casing which results in a more perfectly cylindrical shape of the encased food product.

Yet another object of the invention is to provide a new article of manufacture, i.e., a self-hanging tubular food casing, as a result of the new method of closing tubular casings.

BRIEF DESCRIPTION OF THE DRAWINGS

FIG. 1 shows a perspective view of a first embodiment of the invention wherein one end of the tubular food casing has been formed into a rigid loop suitable for hanging the casing.

FIG. 2 shows a plurality of longitudinal folds in one end of the casing, wherein the folds extend radially outward from an imaginary longitudinal centerline of the casing.

FIG. 3 is a cross-sectional view taken at plane 3—3 of FIG. 2.

FIG. 4 is identical to FIG. 3 except showing the layers of casing which form the folds as having been heat sealed.

FIG. 5 shows the casing with the heat sealed folds flattened in preparation for further heat sealing and rolling.

FIG. 6 is a cross-sectional view taken at plane 6—6 in FIG. 5.

FIG. 7 is identical to FIG. 6 to except showing the longitudinal folds as having been heat sealed together.

FIG. 8 is a side view of the tubular casing shown in FIG. 1.

FIG. 9 is a view of an alternative embodiment of the casing, similar to FIG. 3, except having only three longitudinal folds.

DETAILED DESCRIPTION OF THE INVENTION

Figure 10:
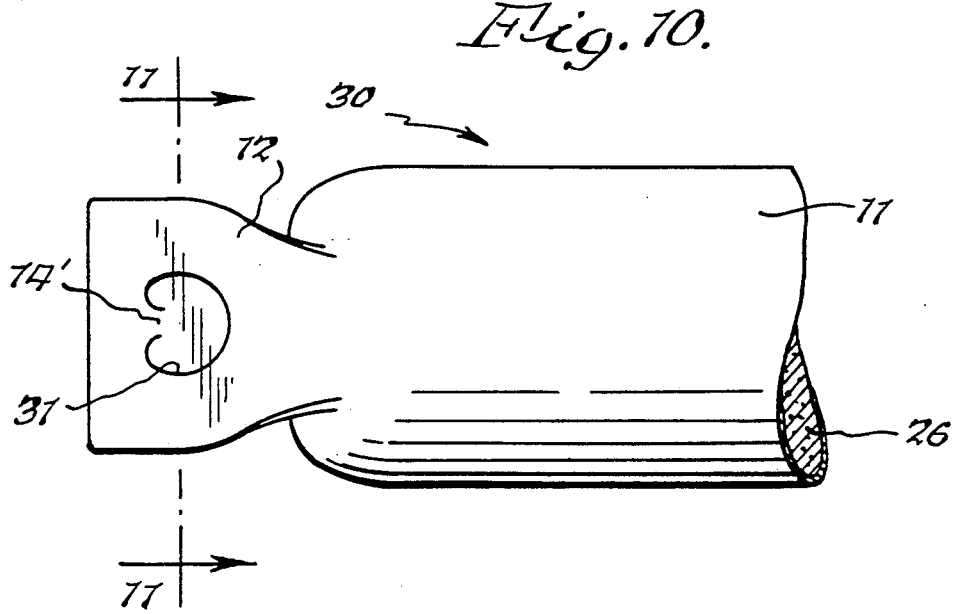
FIG. 10 is a side view of a second embodiment wherein one end of the tubular food casing includes a die cut hole to make it suitable for hanging the casing.

At the outset, it is to be understood that the drawings are to be read together with the specification, and are to be considered a portion of the entire "written description" of this invention, as required by 35 U.S.C. 112. Also, identical reference numerals on different figures refer to identical elements of the invention.

Described herein are several preferred embodiments of the invention which illustrate the best mode of practicing the invention known to the inventor at the time of filing an application for this patent. However, the claims are not intended to be limited in scope to the specific embodiments described herein, but are instead directed to the broader concept of forming part of a tubular food casing into a hanger. In this regard it is to be recognized that the precise method depicted in the drawings is not intended to limit the scope of the claims. For example, although four longitudinal folds are shown, more or less folds are also contemplated. While less folds (e.g., three) would require less time to make, this would also adversely effect the tubular shape of the filled casing. Conversely, more folds would result in a truer tubular shape, but would require more time to make. Also, although heat sealing and adhesive are described as preferred methods of sealing and forming the casing ends, it may not be necessary in all cases to use both methods to seal the casing (i.e., heat sealing alone or adhesive alone may be sufficient). Also, although one embodiment of the invention described herein includes a die cut hole in one end of the casing which does not sever the casing material along the longitudinal centerline, the hole may be made in any manner and take any form and may indeed sever the material along the longitudinal centerline.

FIG. 1 illustrates first embodiment 10 of the invention. Casing 11 is generally cylindrical or tubular in shape after filling with food product (see, e.g., food product 26 shown in FIG. 8). FIG. 1 shows the end result of the method of the invention, wherein end 12 of casing 11 has been formed into rigid loop 13. Loop 13 may be secured about a hook or other fastening device to hang the food-filled casing.

The first step in the method is to form one end of the tubular casing into a flattened portion. FIG. 2 illustrates one way of doing this, wherein end 12 is formed into four longitudinal folds 18, 19, 20 and 21, respectively. Each fold comprises two layers of casing 11. For example, fold 18 comprises layers 15 and 16. The folds extend radially outward from imaginary longitudinal centerline 14 of casing 11.

FIG. 3 is a cross-sectional view of the casing taken along plane 3—3 of FIG. 2. Obviously, merely folding the casing may be insufficient to seal the food product inside and prevent its escape through the seams of the folds. For this reason, it is preferable to heat seal the folds such that the individual layers of the folds melt into an integral piece. FIG. 4 is a view similar to that of FIG. 3 after heat sealing, which shows that seams 18', 19', 20', and 21' have been eliminated. Although heat sealing is preferred, it is also possible to seal the folds with adhesive. Although not recommended, the end of the casing may be rolled into a loop without heat sealing or adhesive.

Adverting now to FIG. 5, casing 11 is shown after folds 18, 19, 20 and 21 have been flattened in preparation for rolling. FIG. 6 is a cross-sectional view of the casing taken along plane 6—6 in FIG. 5. Although not necessary, it is preferable to either heat seal or bind by adhesive the individual folds 18, 19, 20 and 21 to form an integral flattened portion 22 as shown in FIG. 7.

The end result of the method is shown in side view in FIG. 8.

As stated previously, it is possible to implement the method of the invention with various number of folds. For example, FIG. 9 illustrates a view of a casing similar to FIG. 3, except having three folds 23, 24 and 25. It should be noted also that, although it is preferred that the folds extend radially outward from the longitudinal centerline of the casing, this is not absolutely necessary to the invention. For example, any method of sealing the casing is intended to be within the scope of this invention, so long as the closure utilizes excess casing (i.e., casing not used to encase food product) and the excess casing itself is formed into a hanger.

Figure 12:
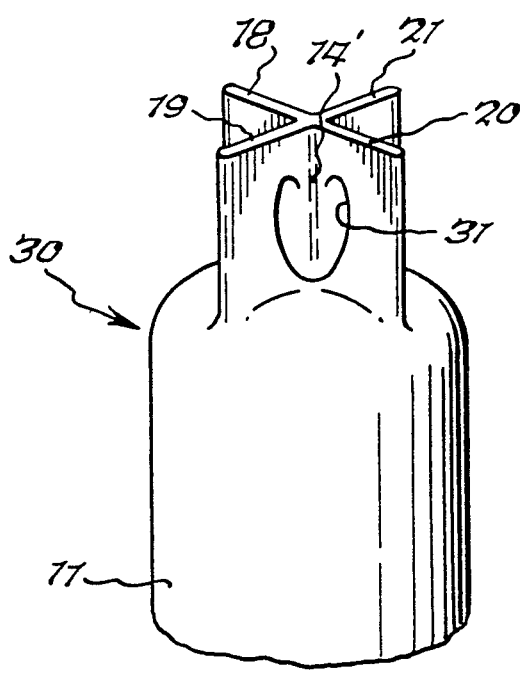
FIG. 12 is a partial perspective view of the casing shown in FIG. 10.

FIGS. 10 and 12 illustrate second embodiment 30 of the invention. The major difference between the first and second embodiments is that, in the second embodiment, end 12 of casing 11 is die cut instead of formed into a rigid loop to form means for hanging the casing.

Figure 11:
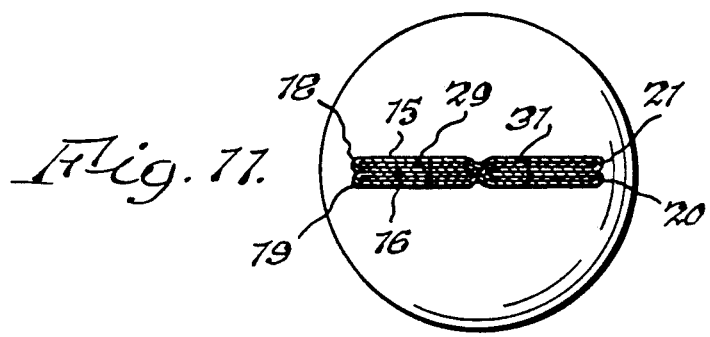
FIG. 11 is a cross-sectional view of the casing of FIG. 10 taken at plane 11—11.

Similarly to the first embodiment, the first step in forming the second embodiment is to form one end of the tubular casing into a flattened portion. Again, FIG. 2 illustrates one way of doing this, wherein end 12 is formed into four longitudinal folds 18, 19, 20, and 21, respectively. Each fold comprises two layers of casing as described previously. It may be desirable to apply a thin layer of adhesive between the layers prior to heat sealing. This applies to both embodiments. FIG. 11 illustrates thin adhesive layer 29 between casing layers 15 and 16 of fold 18. Similar adhesive layers would be applied to all other fold layers.

Also similarly to the first embodiment, the individual folds are heat sealed to prevent food product from escaping. Once the individual folds are heat sealed, a hole 31 is die cut into casing end 12. Die cut hole 31 is preferably made so as to leave casing material intact at the intersection of folds 18, 19, 20 and 21 (coincident with longitudinal centerline 14). The intact material is indicated at 14' in FIG. 12, and functions to strengthen the integral hanger means and ensure its integrity. Although it is possible to die cut a hole completely through end 12, severing the material along the longitudinal centerline of the casing, this would result in a weaker hanging means.

Once die cut hole 31 has been made, folds 18, 19, 20 and 21 are separated as shown in FIG. 12, and the casing is ready for hanging.

While preferred embodiments of the method and article of manufacture of the invention have been described herein, it is to be understood that the invention is not limited to this precise form, and that changes may be made therein without departing from the scope of the invention, as defined in the appended claims.

What is claimed is:

1. A method of closing a tubular food casing, comprising the steps of:
   making a plurality of longitudinal folds in one end of said casing, wherein each of said folds comprises at least two layers of said casing, and wherein each of said longitudinal folds extends radially outward from a longitudinal centerline of said tubular casing; and
   sealing each of said at least two layers together such that food product is prevented from escaping through said folds.

2. A method as recited in claim 1 wherein said plurality of longitudinal folds comprises at least three folds.

3. A method as recited in claim 1 wherein said sealing comprises gluing said layers together.

4. A method as recited in claim 1 wherein said sealing comprises heat sealing said layers together.

5. A method as recited in claim 1 further comprising the step of making a hole in at least one of said longitudinal folds to accommodate a hanger for said casing.

6. A method as recited in claim 5 wherein said hole passes through all of said longitudinal folds and said hole is located approximately at the longitudinal centerline of said tubular casing such that forces exerted upon said casing by a hanger secured to said casing through said hole are uniformly distributed among said folds.

7. A method of closing a tubular food casing, comprising:
   forming excess casing at one end of said tubular food casing into a flattened portion;
   coating said flattened portion with adhesive; and
   forming said flattened portion into a rigid loop suitable for use as a hanger for said casing, wherein excess casing is defined as casing which is not used to encase food.

8. A method as recited in claim 7 wherein said forming said flattened portion into a rigid loop comprises rolling said flattened portion into a rigid loop.

9. A method of closing a tubular food casing, comprising the steps of:
making a plurality of longitudinal folds in one end of said casing, wherein each of said folds comprises at least two layers of said casing, and wherein each of said longitudinal folds extends radially outward from a longitudinal centerline of said tubular casing;
sealing each of said at least two layers together such that food product is prevented from escaping through said folds;
flattening said folds one atop another;
coating said flattened folds with adhesive; and
forming said adhesive coated flattened folds into a rigid loop suitable for hanging said casing.

10. A method as recited in claim 9 wherein said plurality of longitudinal folds comprises at least three folds.

11. A method as recited in claim 9 wherein said sealing comprises gluing said layers together.

12. A method as recited in claim 9 wherein said sealing comprises heat sealing said layers together.

13. A method as recited in claim 9 wherein said forming said adhesive coated flattened folds into a rigid loop comprises rolling said adhesive coated flattened folds into a rigid loop.

14. An improved tubular food casing, comprising:
a plurality of longitudinal folds in one end of said casing, wherein each of said folds comprises at least two layers of said casing, and wherein each of said longitudinal folds extends radially outward from a longitudinal centerline of said tubular casing,
wherein each of said at least two layers are sealed together such that food product is prevented from escaping through said folds.

15. An improved tubular food casing as recited in claim 14 wherein said plurality of longitudinal folds comprises at least three folds.

16. An improved tubular food casing as recited in claim 14 wherein said layers are glued together.

17. An improved tubular food casing as recited in claim 14 wherein said layers are heat sealed together.

18. An improved tubular food casing as recited in claim 14 wherein at least one of said longitudinal folds includes a hole to accommodate a hanger for said casing.

19. An improved tubular food casing as recited in claim 18 wherein said hole passes through all of said longitudinal folds and said hole is located approximately at the longitudinal centerline of said tubular casing such that forces exerted upon said casing by a hanger secured to said casing through said hole are uniformly distributed among said folds.

20. An improved tubular food casing, comprising excess casing at one end of said tubular food casing formed into a flattened portion, said flattened portion coated with adhesive and formed into a rigid loop suitable for use as a hanger for said casing, wherein excess casing is defined as casing which is not used to encase food.

21. An improved tubular food casing, comprising:
a plurality of longitudinal folds in one end of said casing, wherein each of said folds comprises at least two layers of said casing, and wherein each of said longitudinal folds extends radially outward from a longitudinal centerline of said tubular casing,
wherein each of said at least two layers are sealed together such that food product is prevented from escaping through said folds, and
wherein said folds are coated with adhesive and positioned one atop another and formed into a rigid loop suitable for hanging said casing.

22. An improved tubular food casing as recited in claim 21 wherein said plurality of longitudinal folds comprises at least three folds.

23. An improved tubular food casing as recited in claim 21 wherein said layers are glued together.

24. An improved tubular food casing as recited in claim 21 wherein said layers are heated sealed together.

* * * * *